United States Patent [19]

Fukai et al.

[11] Patent Number: 4,914,294
[45] Date of Patent: Apr. 3, 1990

[54] METHOD OF AND APPARATUS FOR CORRECTING IMAGE SIGNAL

[75] Inventors: Nobutaka Fukai; Akira Yamaguchi, both of Kanagawa, Japan

[73] Assignee: Fuji Photo Film Co., Ltd., Kanagawa, Japan

[21] Appl. No.: 250,189

[22] Filed: Sep. 28, 1988

[30] Foreign Application Priority Data

Sep. 28, 1987 [JP] Japan ................................ 62-244832

[51] Int. Cl.$^4$ ............................................ G01N 23/04
[52] U.S. Cl. ................................................ 250/327.2
[58] Field of Search ...................... 358/285; 250/327.2, 250/484.1 B

[56] References Cited

U.S. PATENT DOCUMENTS 4,754,143 6/1988 Fukai et al. ................... 250/484.1 B Primary Examiner—Carolyn E. Fields
Attorney, Agent, or Firm—Sughrue, Mion, Zinn, Macpeak & Seas

[57] ABSTRACT

An image signal is read by scanning a stimulable phosphor sheet on which radiation image information is recorded, with a stimulating light beam to cause the stimulable phosphor sheet to emit light representative of the recorded radiation image information, and photoelectrically detecting the emitted light. A change in the scanning speed at which the stimulable phosphor sheet is scanned with the stimulating light beam, is determined, and a corrective signal is determined based on the determined change in the scanning speed and a corrective coefficient established by at least reading conditions employed to read the radiation image information. The image signal is corrected with the corrective signal.

9 Claims, 2 Drawing Sheets

METHOD OF AND APPARATUS FOR CORRECTING IMAGE SIGNAL

BACKGROUND OF THE INVENTION

The present invention relates to a method of and an apparatus for correcting an image signal produced by scanning a stimulable phosphor sheet on which radiation image information is recorded, with a stimulating light beam to cause the stimulable phosphor sheet to emit light representative of the recorded radiation image information, and photoelectrically detecting the emitted light, and more particularly to a method of and an apparatus for correcting a change in an image signal due to a variation in the scanning speed at which the stimulable phosphor sheet is scanned with the stimulating light beam, by detecting such a variation in the scanning speed.

There has recently been known a radiation image information recording and reproducing system for producing the radiation-transmitted image of an object using a stimulable phosphor material capable of emitting light upon exposure to stimulating rays When a certain phosphor is exposed to a radiation, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information which is recorded as a visible image on a recording medium such as a photosensitive material or displayed as a visible image on a CRT or the like.

One arrangement for reading recorded image information from a stimulable phosphor sheet in such a system employs a light deflector such a galvanometer mirror for deflecting a light beam such as a laser beam. If the light deflector has an accuracy error, then the speed at which the stimulable phosphor sheet is scanned with the light beam is varied, making it impossible to obtain accurate image information from the stimulable phosphor sheet. More specifically, if the scanning speed of the light beam is not constant, the time in which the light beam is applied to the stimulable phosphor is varied, and no accurate image information can be obtained.

SUMMARY OF THE INVENTION

It is a principal object of the present invention to provide a method of and an apparatus for correcting an image signal based on a detected change in the scanning speed of a light beam, so that a variation in the image signal due to such a change in the scanning speed can be corrected and a highly accurate image signal can be obtained.

Another object of the present invention is to provide a method of correcting an image signal read by scanning a stimulable phosphor sheet on which radiation image information is recorded, with a stimulating light beam to cause the stimulable phosphor sheet to emit light representative of the recorded radiation image information, and photoelectrically detecting the emitted light, the method comprising the steps of: determining a change in the scanning speed at which the stimulable phosphor sheet is scanned with the stimulating light beam; producing a corrective signal based on the change in the scanning speed and a corrective coefficient established by at least reading conditions employed to read the radiation image information; and correcting the image signal with the corrective signal.

Still another object of the present invention is to provide a method of correcting an image signal, further comprising the steps of: determining the deflecting position in which the stimulating light beam is deflected as a detected position signal; comparing the detected position signal with a predetermined position signal to provide a position deviation signal; and differentiating the position deviation signal to determine the change in the scanning speed.

Yet another object of the present invention is to provide a method of correcting an image signal further comprising the steps of: establishing the corrective coefficient based on the intensity of the stimulating light beam and the reading conditions; and multiplying the change in the scanning speed by the corrective coefficient and a predetermined parameter to produce the corrective signal.

Yet still another object of the present invention is to provide a method of correcting an image signal, where the reading conditions include the density of scanning lines produced on the stimulable phosphor sheet by the stimulating light beam, the time in which to apply the stimulating light beam to the stimulable phosphor sheet per unit area thereof, and the type of the stimulable phosphor sheet.

It is also an object of the present invention to provide an apparatus for correcting an image signal read from a stimulable phosphor sheet by scanning the same with a stimulating light beam, comprising: a light deflector for deflecting the stimulating light beam to scan the stimulable phosphor sheet on which radiation image information is recorded, with the stimulating light beam; position detecting means for detecting a position in which the stimulating light beam is deflected by the light deflector; comparing means for comparing a detected position signal produced by the position detecting means with a predetermined position signal to produce a position deviation signal; a differentiator for differentiating the position deviation signal to determine a change in the scanning speed at which the light deflector scans the stimulable phosphor sheet with the stimulating light beam; correcting means for producing a corrective signal based on the change in the scanning speed and a corrective coefficient established by at least reading conditions employed to read the radiation image information, and for correcting the image signal with the corrective signal.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
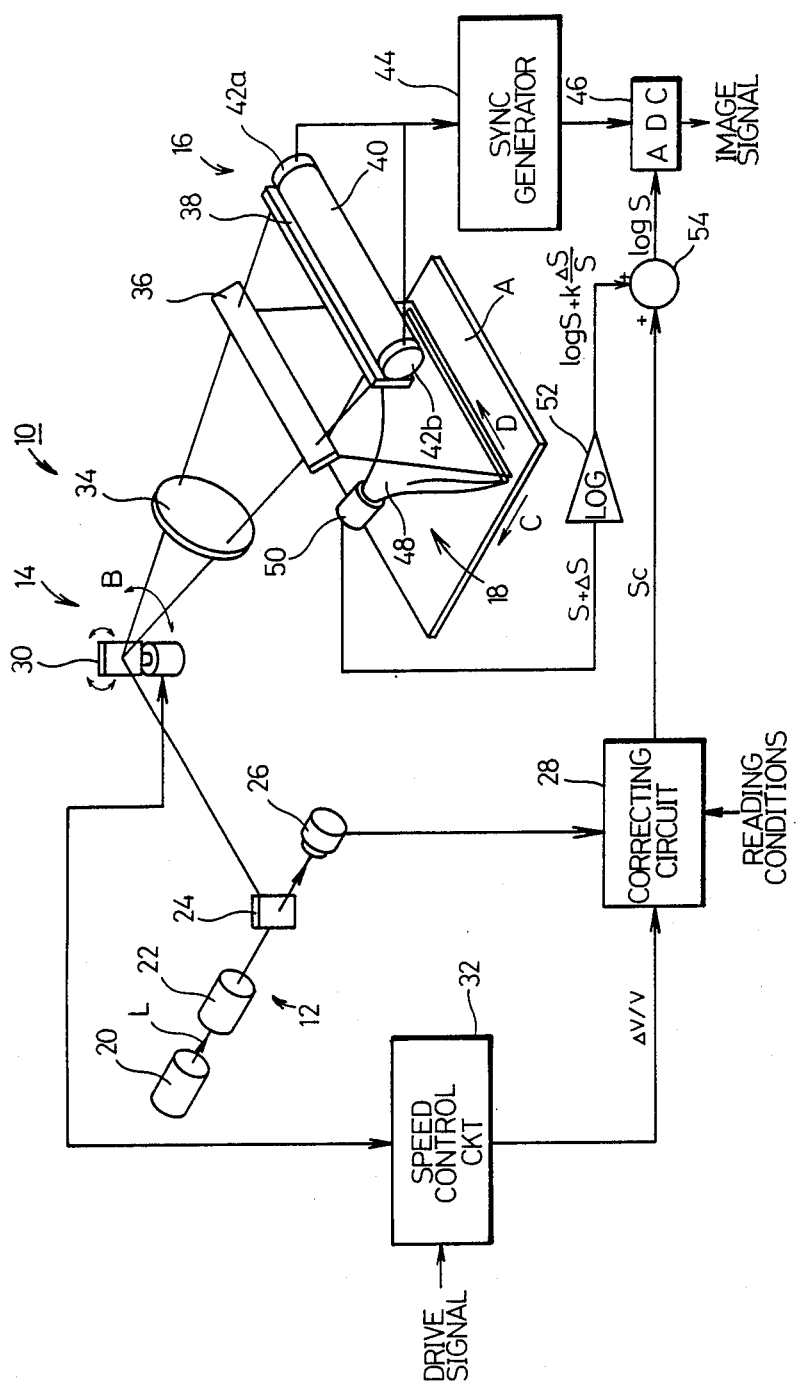
FIG. 1 is a schematic view, partly in block form, of an image reading system incorporating a method of and an apparatus for correcting an image signal according to the present invention.

FIG. 1 shows an image reading system in which a method of and an apparatus for correcting an image signal according to the present invention is incorporated. The image reading system, generally designated by the reference numeral 10, essentially comprises a beam emission unit 12 for emitting a laser beam L, a laser scanning unit 14 for scanning the laser beam L, a synchronizing signal generator 16 for generating a synchronizing signal for image scanning from the laser beam L, and an image reading unit 18 for reading recorded image information from a stimulable phosphor sheet A based on the laser beam L. The stimulable phosphor sheet A records thereon radiation image information of an object such as a human body.

The beam emission unit 12 has a laser oscillating tube 20 for emitting the laser beam L, and a beam expander 22 for adjusting the diameter of the laser beam L. The laser beam L that has passed through the beam expander 22 is divided into two beams by a half-silvered mirror 24. The laser beam L that has passed through the half-silvered mirror 24 is applied to a power monitor 26 comprising a photodiode or the like. A laser output power signal detected by the power monitor 26 is supplied to a correcting circuit 28 (described later on).

The laser beam L that has been reflected by the half-silvered mirror 24 is directed to a light deflector comprising a galvanometer mirror 30 which oscillates back and forth at a high speed based on a drive signal supplied from a speed control circuit 32 of an image signal correcting apparatus according to the present invention. The laser beam L applied to the galvanometer mirror 30 is deflected thereby and goes through a scanning lens 34 such as an fθ lens to another half-silvered mirror 36. The speed control circuit 32 actuates the galvanometer mirror 30 and also detects the speed at which the galvanometer mirror 30 deflects the laser beam. The speed control circuit 32 supplies a signal representative of any variation in the detected deflecting speed to the correcting circuit 28.

The half-silvered mirror 36 splits the laser beam L into two beams and guides them to the synchronizing signal generator 16 and the stimulable phosphor sheet A. The synchronizing signal generator 16 basically comprises a grid 38 disposed along the direction in which the laser beam L is deflected, a cylindrical light collecting rod 40 disposed behind the grid 38, and a pair of light sensors 42a, 42b mounted respectively on the opposite ends of the light collecting rod 40. The grid 38 has an array of alternate slits and bars along its longitudinal direction. The laser beam L applied to the grid 38 is led as a pulsed light signal through the light collecting rod 40 to the light sensors 42a, 42b. In response to the light signal, the light sensors 42a, 42b apply signals to a synchronizing signal generating circuit 44 which then produces and supplies a synchronizing signal as a timing clock signal to an A/D converter 46.

The laser beam L reflected by the half-silvered mirror 36 is directed to the stimulable phosphor sheet A. The image reading unit 18 includes a light guide 48 having one end disposed near the stimulable phosphor sheet A. On the other end of the light guide 48, there is mounted a photomultiplier 5 for converting light emitted from the stimulable phosphor sheet A into an electric image signal, which is hen converted by a logarithmic amplifier 52 into a logarithmic function signal that is applied to one input terminal of an adder 54. The other input terminal of the adder 54 is supplied with a corrective signal from the correcting circuit 28. An output signal from the adder 54 is supplied to an A/D converter 46 which converts the applied signal to a digital signal based on a synchronizing signal from the synchronizing signal generating circuit 44.

Figure 2:
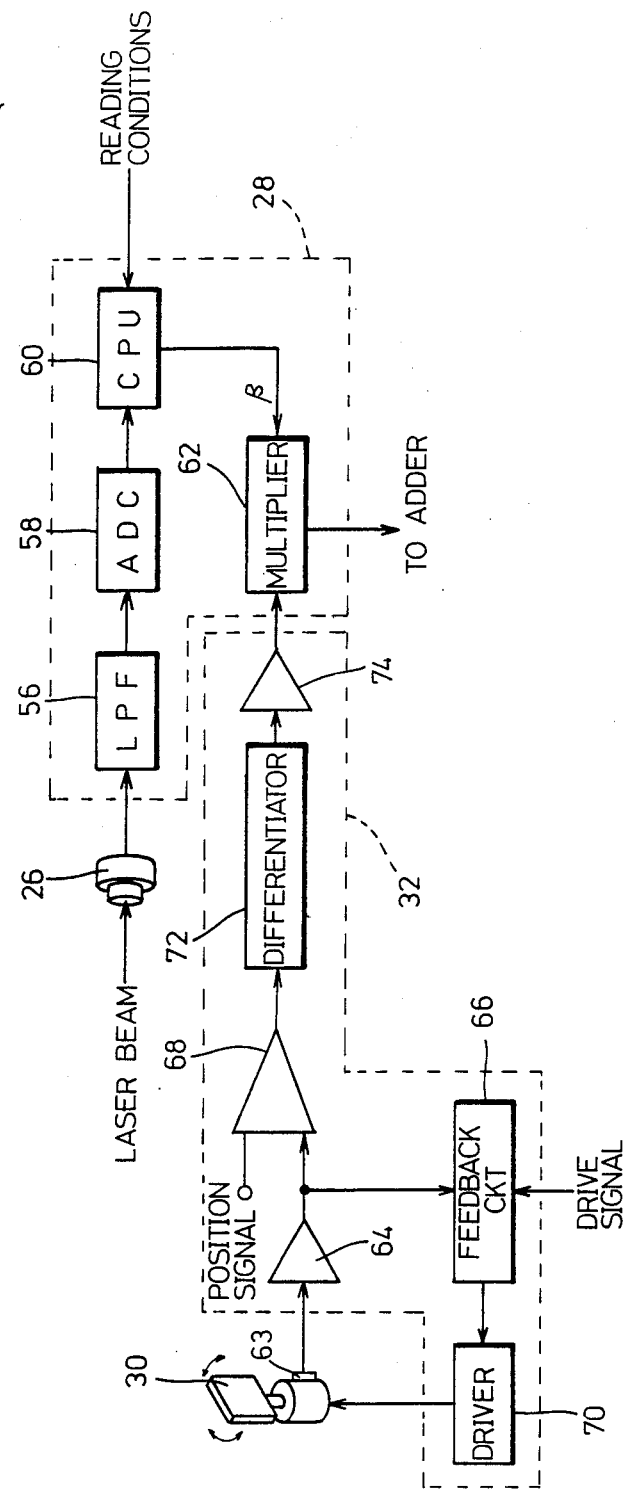
FIG. 2 is a block diagram of a correcting circuit and a speed control circuit of the image reading system shown in FIG. 1.

FIG. 2 shows in detailed block form the correcting circuit 28 and the speed control circuit 32 of the image signal correcting apparatus. The correcting circuit 28 has a low-pass filter 56 for passing a DC component of the laser power output signal from the power monitor 26. The DC component from the low-pass filter 56 is supplied through an A/D converter 58 to a CPU 60. The CPU 60 processes the supplied DC component according to reading conditions for the image information on the stimulable phosphor sheet A to produce a corrective coefficient $\beta$ that is supplied to a multiplier 62. The reading conditions include, for example, the density of scanning lines produced by the laser beam L, the time in which to apply the laser beam to the stimulable phosphor sheet A per unit area thereof, and the type of the stimulable phosphor sheet A.

The galvanometer mirror 30 has a capacitance-type position detector 63, for example, for detecting the laser beam deflecting position. A detected position signal generated by the position detector 63 is supplied through an amplifier 64 to a feedback circuit 66 and one input terminal of a comparator 68 of the speed control circuit 32. The position signal may be produced by the synchronizing signal generator 16 based on the scanning position of the laser beam L. The feedback circuit 66 is responsive to a drive signal for enabling a driver 70 to oscillate the galvanometer mirror 30 at a high speed. The feedback circuit 66 also serves o keep the deflecting speed of the mirror 30 at a constant level based on the detected position signal.

The other input terminal of the comparator 68 is supplied with a position signal which is the same as the drive signal applied to the feedback circuit 66. The comparator 68 compares the detected position signal applied to one input terminal from the position detector 63 and the position signal applied to the other input terminal, and issues the result of comparison as a position deviation signal to a differentiator 72. The differentiator 72 differentiates the position deviation signal and supplies the differentiated signal as a signal indicative of a change in the scanning speed of the galvanometer mirror 30 through an amplifier 74 to the multiplier 62 of the correcting circuit 28. The multiplier 62 multiplies the change in the scanning speed by the corrective coefficient and applies the product as a corrective signal to the adder 54.

Operation and advantages of the image reading system thus constructed will be described below.

The laser beam L emitted from the laser oscillating tube 20 is applied to the beam expander 22 by which the beam diameter is adjusted to a prescribed beam diameter. Thereafter, the laser beam L is applied to the half-silvered mirror 24, which passes a portion of the laser beam L to the power monitor 26 and reflects the remainder of the laser beam L toward the galvanometer mirror 30.

The galvanometer mirror 30 is oscillated at a high speed by the driver 70 based on a drive signal supplied to the feedback circuit 66 (FIG. 2). The laser beam L led to the galvanometer mirror 30 is deflected in the direction of the arrow B, and applied through the scanning lens 34 to the half-silvered mirror 36. The laser beam L applied to the half-silvered mirror 36 is partly reflected thereby to scan the stimulable phosphor sheet A in a main scanning direction indicated by the arrow D while the stimulable phosphor sheet A is being fed along in an auxiliary scanning direction represented by the arrow C. Application of the laser beam L to the stimulable phosphor sheet A stimulates the same to emit light representative of the recorded image information. The emitted light is then guided through the light guide 48 disposed near the sheet A to the photomultiplier 50, which converts the applied light to an electric image signal.

The laser beam L is also partly passed through the half-silvered mirror 36 and scans the grid 38 of the synchronizing signal generator 16. The laser beam L as it passes through the slit array of the grid 38 is led as a pulsed light signal through the light collecting rod 40 to the light sensors 42a, 42b. The light sensors 42a, 42b photoelectrically converts the light signal to electric signals that are fed to the synchronizing signal generating circuit 44. The synchronizing signal generating circuit 44 comprises a frequency synthesizer, for example, to multiply the frequency of the signals from the light sensors 42a, 42b for thereby generating a synchronizing signal.

The image signal produced by the photomultiplier 50 is converted by the logarithmic amplifier 52 into a logarithmic function signal that is supplied via the adder 54 to the A/D converter 46. The image signal is then converted by the A/D converter 46 into a digital image signal based on the synchronizing signal from the synchronizing signal generating circuit 44.

The deflecting speed of the galvanometer mirror 30 is controlled at a constant level by the feedback circuit 66. However, since the feedback circuit 66 generally has a response delay, it is impossible to make the deflecting speed exactly constant. Therefore, the deflecting speed of the galvanometer mirror 30 includes a certain fluctuation or change which will result in a fluctuation or change in the time in which the stimulable phosphor sheet A is exposed to the laser beam L.

Assuming that the image signal supplied from the photomultiplier 50 to the logarithmic amplifier 52 is represented by $(S+\Delta S)$, the output signal Sa produced by the logarithmic amplifier 52 is expressed by:

$$Sa = \log(S + \Delta S) \sim \log S + k \cdot \frac{\Delta S}{S} \quad (1)$$

$$\left[1 >> \frac{\Delta S}{S}\right]$$

where S represents the image signal produced when the galvanometer mirror 30 deflects the laser beam at a constant speed, $\Delta S$ a change in the image signal due to the fluctuation or change in the scanning speed of the mirror 30, and k a constant. Therefore, an accurate image signal can be obtained by eliminating the second term on the righthand side of the equation (1) based on the fluctuation in the scanning speed of the galvanometer mirror 30.

The fluctuation or change in the scanning speed of the galvanometer mirror 30 is detected by the speed control circuit 32. The detected position signal from the position detector 63 associated with the galvanometer mirror 30 is supplied via the amplifier 64 to one of the input terminals of the comparator 68. The other input terminal of the comparator 68 is supplied with the position signal which is the same as the drive signal for driving the galvanometer mirror 30. The comparator 68 then supplies a position deviation signal which is the difference between the detected position signal and the position signal to the differentiator 72. The differentiator 72 differentiates the position deviation signal, and applies the produced derivative as a change $\Delta V/V$ in the scanning speed of the galvanometer mirror 30 through the amplifier 74 to the multiplier 62, V indicating the deflecting speed of the galvanometer mirror 30 based on the drive signal, and $\Delta V$ a deviation or change from the deflecting speed V.

The change $\Delta V/V$ in the scanning speed and the change $\Delta S/S$ in the image signal have the following relationship:

$$\beta \cdot \frac{\Delta V}{V} = \frac{\Delta S}{S} \quad (2)$$

where $\beta$ is the corrective coefficient determined by the reading conditions such as the density of scanning lines produced by the laser beam L, the time in which to apply the laser beam L to the stimulable phosphor sheet A per unit area thereof, and the type of the stimulable phosphor sheet A, and the power intensity of the laser beam L. The power intensity of the laser beam L is detected by the power monitor 26 and supplied as a laser output signal to the low-pass filter 5 of the correcting circuit 28. The low-pass filter 56 passes a DC component of the laser output signal and supplies the DC component via the A/D converter 58 to the CPU 60. The CPU 60 determines the corrective coefficient $\beta$ based on the reading conditions and the DC component of the laser beam L, and supplies the corrective coefficient $\beta$ to the multiplier 62.

The amplification factor of the multiplier 62 is set to $-k$. The multiplier 62 multiplies the change $\Delta V/V$ in the scanning speed supplied from the speed control circuit 32 by the corrective coefficient $\beta$ and the amplification factor $-k$, and applies a corrective signal Sc, expressed below, to the adder 54.

$$Sc = -k \cdot \beta \cdot \frac{\Delta V}{V} \quad (3)$$

The adder 54 is also supplied with the output signal Sa, indicated by the equation (1), from the logarithmic amplifier 52. Since, in view of the equation (2), the equation (3) can be written as the following equation (4):

$$Sc = -k \cdot \frac{\Delta S}{S} \quad (4)$$

the image signal supplied from the adder 54 to the A/D converter 46 is corrected by a quantity corresponding to the change $\Delta V/V$ in the scanning speed of the galvanometer mirror 30, and the corrected signal is then supplied to the A/D converter 46. Therefore, the A/D converter 46 issues a desired image signal as a digital signal which is free from the effect of the change or fluctuation in the deflecting speed of the galvanometer mirror 30.

With the present invention, as described above, when producing an image signal based on light emitted from a stimulable phosphor sheet by scanning the stimulable phosphor sheet with a stimulating light beam such as a laser beam, a change or fluctuation in the scanning speed of the stimulating light beam is detected, and the image signal is corrected based on the detected change in the scanning speed. Therefore, a change or fluctuation in the time in which the stimulable phosphor sheet is exposed to the stimulating light beam, due to the change in the scanning speed, can be corrected, and thus an accurate image signal can be produced.

Although a certain preferred embodiment has been shown and described, it should be understood that many changes and modifications may be made therein without departing from the scope of the appended claims.

What is claimed is:

1. A method of correcting an image signal read by scanning a stimulable phosphor sheet on which radiation image information is recorded, with a stimulating light beam to cause the stimulable phosphor sheet to emit light representative of the recorded radiation image information, and photoelectrically detecting the emitted light, said method comprising the steps of:
   determining a change in the scanning speed at which the stimulable phosphor sheet is scanned with the stimulating light beam;
   receiving reading conditions used to read said recorded radiation image information, and producing a corrective coefficient with respect to said reading conditions, said reading conditions including at least one of the density of scanning lines produced on the stimulable phosphor sheet by the stimulating light beam, the time in which to apply the stimulating light beam to the stimulable phosphor sheet per unit area thereof, and the type of the stimulable phosphor sheet;
   producing a corrective signal based on the change in the scanning speed and said corrective coefficient; and
   correcting said image signal with said corrective signal.

2. A method of correcting an image signal read by scanning a stimulable phosphor sheet on which radiation image information is recorded, with a stimulating light beam to cause the stimulable phosphor sheet to emit light representative of the recorded radiation image information, and photoelectrically detecting the emitted light, said method comprising the steps of:
   determining a change in the scanning speed at which the stimulable phosphor sheet is scanned with the stimulating light beam;
   producing a corrective signal based on the change in the scanning speed and a corrective coefficient established by at least reading conditions employed to read the radiation image information;
   correcting said image signal with said corrective signal;
   determining the deflecting position in which the stimulating light beam is deflected as a detected position signal;
   comparing said detected position signal with a predetermined position signal to provide a position deviation signal; and
   differentiating said position deviation signal to determine said change in the scanning speed.

3. A method of correcting an image signal read by scanning a stimulable phosphor sheet on which radiation image information is recorded, with a stimulating light beam to cause the stimulable phosphor sheet to emit light representative of the recorded radiation image information, and photoelectrically detecting the emitted light, said method comprising the steps of:
   determining a change in the scanning speed at which the stimulable phosphor sheet is scanned with the stimulating light beam;
   producing a corrective signal based on the change in the scanning speed and a corrective coefficient established by at least reading conditions employed to read the radiation image information;
   correcting said image signal with said corrective signal;
   establishing said corrective coefficient based on the intensity of said stimulating light beam and said reading conditions; and
   multiplying said change in the scanning speed by said corrective coefficient and a predetermined parameter to produce said corrective signal.

4. A method according to claim 3, wherein said corrective coefficient is established using said reading conditions which include at least one of the density of scanning lines produced on the stimulable phosphor sheet by the stimulating light beam, the time in which to apply the stimulating light beam to the stimulable phosphor sheet per unit area thereof, and the type of the stimulable phosphor sheet.

5. An apparatus for correcting an image signal read from a stimulable phosphor sheet by scanning the same with a stimulating light beam, comprising:
   a light deflector for deflecting the stimulating light beam to scan the stimulable phosphor sheet on which radiation image information is recorded, with the stimulating light beam;
   position detecting means for detecting a position in which the stimulating light beam is deflected by said light deflector;
   comparing means for comparing a detected position signal produced by said position detecting means with a predetermined position signal to produce a position deviation signal;
   a differentiator for differentiating said position deviation signal to determine a change in the scanning speed at which said light deflector scans said stimulable phosphor sheet with said stimulating light beam; and
   correcting means for producing a corrective signal based on said change in the scanning speed and a corrective coefficient established by at least reading conditions employed to read the radiation image information, and for correcting said image signal with said corrective signal.

6. An apparatus for correcting an image signal read by scanning a stimulable phosphor sheet on which radiation image information is recorded, with a stimulating light beam to cause the stimulable phosphor sheet to emit light representative of the recorded radiation image information, and photoelectrically detecting the emitted light, said apparatus comprising:

speed change means for determining a change in the scanning speed at which the stimulable phosphor sheet is scanned with the stimulating light beam;

coefficient means for receiving reading conditions which are employed to read said recorded radiation image information, and producing a corrective coefficient with respect to said reading conditions, said reading conditions including at least one of the density of scanning lines produced on the stimulable phosphor sheet by the stimulating light beam, the time in which to apply the stimulating light beam to the stimulable phosphor sheet per unit area thereof, and the type of the stimulable phosphor sheet;

corrective signal means for producing a corrective signal based on the change in the scanning speed and said corrective coefficient; and correction means for correcting said image signal with said corrective signal.

7. An apparatus for correcting an image signal read by scanning a stimulable phosphor sheet on which radiation image information is recorded, with a stimulating light beam to cause the stimulable phosphor sheet to emit light representative of the recorded radiation image information, and photoelectrically detecting the emitted light, said apparatus comprising:

speed change means for determining a change in the scanning speed at which the stimulable phosphor sheet is scanned with the stimulating light beam;

corrective signal means for producing a corrective signal based on the change in the scanning speed and a corrective coefficient established by at least reading conditions used to read the radiation image information;

correction means for correcting said image signal with said corrective signal;

deflection means for determining the deflecting position in which the stimulating light beam is deflected as a detected position signal;

comparison means for comparing said detected position signal with a predetermined position signal to provide a position deviation signal; and differentiating means for differentiating said position deviation signal to determine said change in the scanning speed.

8. An apparatus for correcting an image signal read by scanning a stimulable phosphor sheet on which radiation image information is recorded, with a stimulating light beam to cause the stimulable phosphor sheet to emit light representative of the recorded radiation image information, and photoelectrically detecting the emitted light, said apparatus comprising:

speed change means for determining a change in the scanning speed at which the stimulable phosphor sheet is scanned with the stimulating light beam;

corrective signal means for producing a corrective signal based on the change in the scanning speed and a corrective coefficient established by at least reading conditions employed to read the radiation image information;

correction means for correcting said image signal with said corrective signal;

corrective coefficient means for establishing said corrective coefficient based on the intensity of said stimulating light beam and said reading conditions; and multiplying means for multiplying said change in the scanning speed by said corrective coefficient and a predetermined parameter to produce said corrective signal.

9. An apparatus according to claim 8, wherein said corrective coefficient is established using said reading conditions which include at least one of the density of scanning lines produced on the stimulable phosphor sheet by the stimulating light beam, the time in which to apply the stimulating light beam to the stimulable phosphor sheet per unit area thereof, and the type of the stimulable phosphor sheet.

* * * * *